United States Patent [19]
Parkinson

[11] 3,787,769
[45] Jan. 22, 1974

[54] NON-CONTACTING SHAFT RPM AND DIRECTION OF ROTATION MEASUREMENT SYSTEM

[76] Inventor: James R. Parkinson, R.D. 3, Vergennes, Vt. 05491

[22] Filed: Aug. 1, 1972

[21] Appl. No.: 277,117

[52] U.S. Cl.................. 324/174, 324/161, 73/507
[51] Int. Cl. ............................................ G01p 3/54
[58] Field of Search ... 324/172, 173, 174, 175, 161, 324/166; 73/507; 250/231 SE; 310/168

[56] References Cited
UNITED STATES PATENTS

| | | | |
|---|---|---|---|
| 3,719,886 | 3/1973 | Vanderberg et al. | 324/175 X |
| 3,248,648 | 4/1966 | Carroll et al. | 324/161 |
| 2,988,695 | 6/1961 | Leavitt | 324/161 X |

FOREIGN PATENTS OR APPLICATIONS
489,803    6/1970    Switzerland......................... 324/166

Primary Examiner—Rudolph V. Rolinec
Assistant Examiner—Rolf Hille
Attorney, Agent, or Firm—Edwin E. Greigg

[57] ABSTRACT

A toothed exciter wheel is rotatably driven continuously in close proximity to a toothed speed reference wheel mounted on a rotatably driven power shaft, the system having a first sensor to sense the algebraic sum of the speeds of the two wheels, a second sensor to sense the speed of the exciter wheel and a circuit arrangement that compares the output signals of the two sensors and provides an indication on a readout device of the speed and direction of rotation of the power shaft.

17 Claims, 3 Drawing Figures

PATENTED JAN 22 1974 3,787,769

NON-CONTACTING SHAFT RPM AND DIRECTION OF ROTATION MEASUREMENT SYSTEM

BACKGROUND OF THE INVENTION

In the operation of vessels, aircraft, etc., it is desirable to know the speed of rotation of the power shaft and its direction of rotation at all shaft speeds including very low shaft speeds approaching zero speed and display this information at a remote point.

Known arrangements of non-contacting sensing systems for measuring shaft speeds in such applications generally utilize a toothed speed reference wheel, such as a gear mounted on the power shaft or a positively geared auxiliary shaft which derives its speed from the power shaft, as one part of a magnetic circuit and a magnetic sensor mounted in close proximity to the teeth as the second part of a magnetic circuit, the parts being arranged so that the teeth of the wheel cause a variation in the air gap between the teeth and sensor which can be detected.

Measurement at low shaft speeds approaching zero speed using non-contacting sensing methods of this type is difficult, because of the inherent threshold associated with the use of stationary sensors where below a given low shaft speed the energy of the signal generated by the sensor is insufficient to register any movement in the indicating device, i.e., there is a basic threshold or sensitivity level whic must be overcome before any measurement of shaft speed is effected.

Further, upon generation of a signal sufficient to actuate the speed indicating circuit, the direction of roration cannot be determined from the signal because the same signal is generated with the shaft rotating in either direction.

Methods of using movable sensing means to increase the relative speed between a power shaft toothed reference wheel and the magnetic sensing means have been devised for the measurement of torque at low shaft speeds, where phase displacement between a toothed reference wheel and a toothed torque responsive toothed wheel is the parameter being measured and the absolute speed of rotation is unimportant. Such methods are described in my copending application Ser. No. 266,479, filed June 26. 1972 entitled "Phase Displacement Measuring Apparatus for Measuring a Characteristic of a System When the System is at a Standstill." In a torque measurement system as described in the aforementiond application the movable sensing means may be rotating or moving continuously or may be started only when the signal level approaches the threshold level. With reference to shaft speed measurement, the speed of a movable sensing means is important and must be determined by the use of a stationary sensor. The movable sensing means itself rotates or moves continually which enables a considerable simplification of the measuring circuit. The movable sensing means is driven at a sufficient minimum speed relative to a stationary sensor such that the signal level output of the stationary speed sensor is well above the threshold level required in the system to operate the indicator.

The frequency of the signal measured between the rotating reference wheel and the exciter wheel is the algebraic sum of the frequencies produced by the teeth of the shaft mounted gear and the transducer exciter gear. If the gears are rotating in the same direction, the measured speed is above the actual speed of the power shaft by a factor corresponding to the speed of the exciter wheel. If the gears are rotating in opposite directions, the measured speed is below the actual speed of the power shaft.

To obtain the true speed of the power shaft, the speee of the exciter wheel is subtracted from the algebraic sum of the speeds of the toothed reference wheel and the exciter wheel.

The exciter wheel is advantageously rotated at a constant speed, with the peripheral speed being maintained at a level sufficient to maintain a signal even at the maximum power shaft speed such that the lowest differential speed between the power shaft reference wheel and the exciter wheel occurs at maximum power shaft speed. This will generally occur in reverse; however, the system is workable with the exciter wheel designed to be rotating in either direction.

OBJECTS OF THE INVENTION

It is the principal object of this invention to provide an improved rpm and direction of rotation measurement system.

It is another object of this invention to provide an improved rpm and direction of rotation measurement system which will measure continuously down to zero rpm of a driven power shaft with improved accuracy.

It is yet another object of this invention to provide an improved rpm and direction of rotation measurement system which can display speed and rotation at a remote point.

It is still another object of this invention to provide an improved non-contacting rpm and direction of rotation measurement system which is rugged and which can be enclosed to exclude dirt and other foreign matter so as to provide extended life and reduced maintenance.

These and other objects of this invention will become clear upon careful study of the following specification along with the drawing and appended claims.

DESCRIPTION OF THE PREFERRED EMBODIMENT

Figure 1:
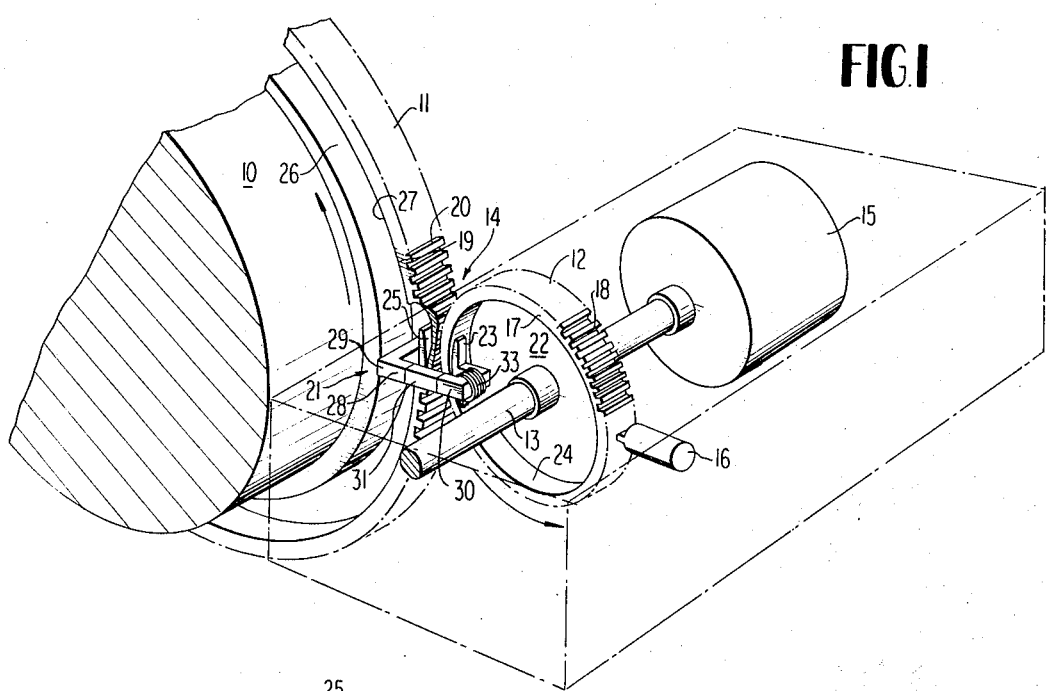
FIG. 1 shows a fractional view of a preferred embodiment of the pickup assembly of the present invention.

Referring now to FIG. 1, there is shown power shaft 10 having a toothed speed reference wheel 11 mounted thereon. Toothed exciter wheel 12 is mounted on shaft 13 arranged with its axis parallel to the power shaft 10 and in the plane of toothed reference wheel 11 so that the teeth of wheel 12 pass in close proximity to the teeth of wheel 11 forming an air gap 14 shown more clearly in FIG. 1. Exciter wheel 12 is driven continuously by drive motor 15 during measurement of shaft speed. Mounted in close proximity to the periphery of the exciter wheel teeth is a stationary magnetic sensor or pickup assembly 16 which is shown positioned diametrically opposite to the air gap formed between reference wheel 11 and exciter wheel 12. It should be readily apparent, however, that sensor 16 may be positioned anywhere around the periphery of wheel 12.

Exciter wheel 12 is axially relieved to provide a thin rim 17 radially within and adjacent teeth 18 and, in a similar manner, the reference wheel 11 is relieved to provide a thin rim 19 radially within and adjacent teeth 20. These axial reliefs provide clearance for the shoes or poles of a sensor assembly 21.

Mounted within the axial relief 22 of toothed exciter wheel 12 is sensor shoe 23 facing the inner cylindrical surface 24. Shoe 23 is magnetically coupled through air gap 14 with a similar sensor shoe 25 mounted within the axial relief 26 of reference wheel 11 and facing the inner cylindrical surface 27. Sensor shoe 23 and sensor shoe 25 are connected via a magnetic core 28 comprising two magnetic steel end portions 29 and 30 and an intermediary magnet 31 which establishes the quiescent flux in the magnetic circuit. Wound around core portion 30 is sensor coil 33 which senses changes in magnetic flux as the dimensions of the air gap 14 change due to the passing of the teeth 20 and 18 of the toothed reference wheel 11 and toothed exciter wheel 12, respectively.

The entire sensing assembly can be enclosed to exclude dirt and other foreign matter by means of housing 32.

Figure 2:
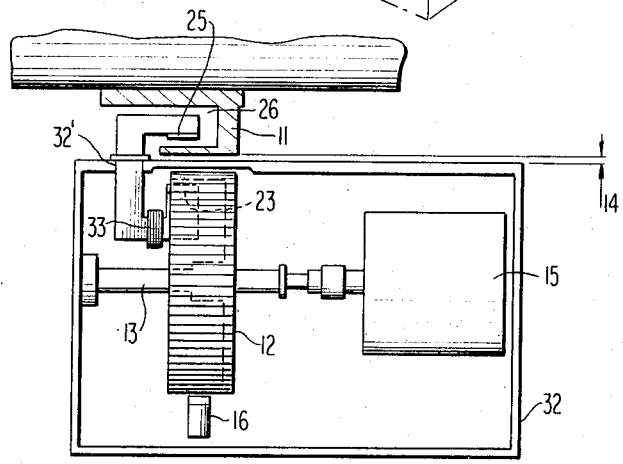
FIG. 2 shows a plan view of the pickup assembly of FIG. 1.

Referring to FIG. 2, toothed reference wheel 11 is shown mounted upon a propulsion shaft 10 with the toothed reference wheel 11 being shown in cross section to further illustrate axial relief 26. Toothed exciter wheel 12 is shown mounted on shaft 13 with its teeth in close proximity to those of reference wheel 11 providing air gap 14 between them. The wall of housing 32 between the pole pieces forms an open magnetic window so that it does not interfere with the flux path of the magnet. Shaft 13 is driven by motor 15 and the entire sensor assembly is enclosed within housing 32 which is indicated by phantom lines in FIG. 1. Housing 32 is made of non-magnetic material, the only openings required being those necessary for the sensor core to pass through at point 32' and for the power cables to motor 15 and wires from sensor coil 33. All of these openings include stationary sealing arrangements easily accomplished as is well known to the art.

Preferably, housing 32 is relieved to a very thin section in the area of the air gap between sensor shoes 23 and 25 to allow for gap 14 to be as small as possible thereby allowing the magnetic flux concentration to be as great as possible. As the teeth 18 and 20 pass through the magnetic flux established in the air gap between shoes 23 and 25, the flux is disturbed. Coil 33 senses a change in flux and generates a frequency proportional to the algebraic sum of the frequencies produced individually by the teeth of the shaft mounted gear 11 and the transducer exciter gear 12.

In describing the embodiment in FIGS. 1 and 2 magnetic sensors have been used by way of example, but once will easily recognize that other forms of sensors may be used without changing the scope or intent of this invention. The principles taught will work equally well using slotted wheels and light sensors, capacitance or eddy current sensors, or any other sensing means which can produce a signal whose frequency is proportional to the speed of the rotating components.

The circuit required to process the signals produced by sensors 21 and 16 may take many forms but it must basically convert the frequency information corresponding to speed of rotation of the wheels which is sensed into analog voltages and add or subtract the analog voltage depending upon the direction of rotation to determine the true shaft speed. One circuit suitable for accomplishing this is shown in FIG. 3.

Figure 3:
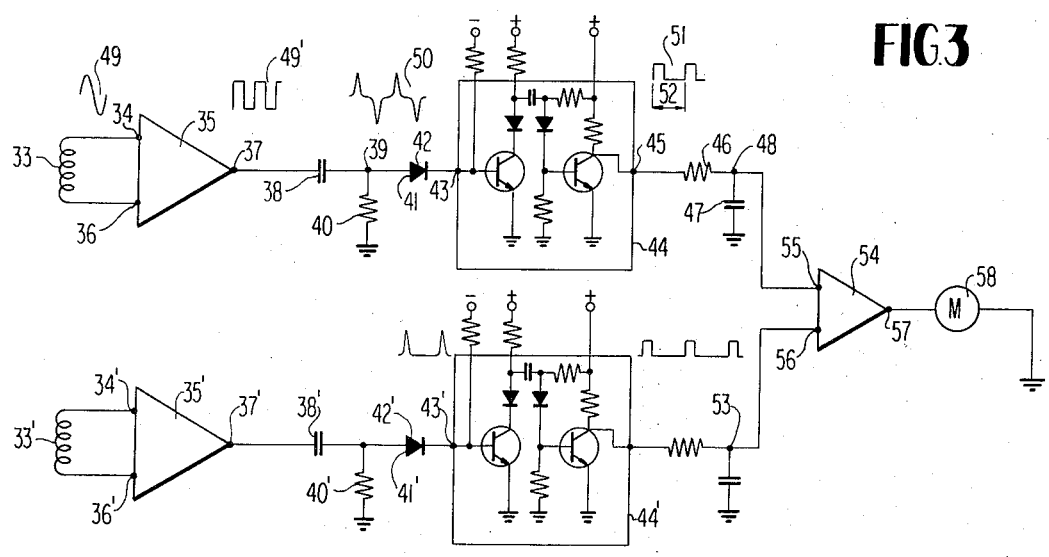
FIG. 3 shows schematically one circuit that can be used to derive the true speed and direction of rotation of the power shaft.

Referring to FIG. 3, sensor coil 33, which forms the sensing element of pickup assembly 21, is connected at one end to one input 34 of differential comparator 35 and at the other end to a second input 36. The output terminal 37 of differential comparator 35 is connected to one plate of capacitor 38, the other plate being connected to point 39 to which is connected one end of resistor 40. The other end of resistor 40 is connected to ground. Thus capacitor 38 and resistor 40 for a differentiating R.C. network which differentiates the square wave output 49' of comparator 35 into positive and negative spikes as shown at 50. Point 39 is also connected to the anode terminal 41 of diode 42. The cathode of diode 41 is connected to input 43 of monostable multivibrator 44. Thus only the positive spikes of signal 50 are passed from the R.C. filter to the multivibrator 44. The output 45 of multivibrator 44 is connected to one end of resistor 46, the other end of which is connected to one plate of capacitor 47 at point 48. The other end of capacitor 47 is connected to ground.

This postion of the circuit operates in the following manner.

The output signal 49 of coil 33 represents the algebraic sum of the frequency produced by the passing of teeth 20 of reference wheel 11 in air gap 14 and the frequency produced by the passing of teeth 18 of exciter wheel 12 in air gap 14. The signal 49 is fed to the differential comparator 35 which, because of its extremely high gain, develops a square wave 49' at its output 37 whose sides correspond in time to the zero crossover points of signal 49. R.C. network 38–40 differentiates the square wave into sharp spikes occurring at a time corresponding to the zero crossover points, as shown by signal 50. Diode 42 passes only the positive spikes to multivibrator 44 which produces a square wave pulse 51 at its output 45 of constant amplitude and width regardless of the input frequency. The time between the occurrence of repeat pulses 52 is a function of the input frequency. Thus the duty cycle of the output square wave is proportional to frequency. This square wave is integrated by R.C. filter comprising capacitor 46 and resistor 47 into a D.C. analog voltage proportional to the algebraic sum of the speeds of reference wheel 11 and exciter wheel 12 and available at point 48.

Referring to the lower left-hand portion of FIG. 3, coil 33' represents the sensing coil of sensor 16 and therefore its output frequency is proportional only to the speed of exciter wheel 12 and is determined by the speed at which teeth 18 of wheel 12 passes sensor 16. It should be apparent that the circuit operates in an identical manner to the upper portion, except that the D.C. analog voltage appearing at point 53 is proportional only to the speed of the exciter wheel 12.

Referring now to the right-hand portion of FIG. 3, there is shown D.C. comparator 54. One input 55 is connected to point 48 and therefore has applied to it the D.C. analog voltage which corresponds to the algebraic sum of the speeds of reference wheel 11 and exciter wheel 12. The second input 56 is connected to point 53 and therefore has applied to it the D.C. analog voltage corresponding to the speed of exciter wheel 12. The output of D.C. comparator 54, point 57 is connected to zero center meter 58 the other side of which is grounded.

Three speed conditions may occur:

Condition 1: Power shaft 10 may be stopped in which case the frequency signal generated by coil 33 will be equal to that generated by coil 33' and the D.C. analog voltages appearing at inputs 55 and 56 will be equal and the output at point 57 will be zero, therefore the meter will read zero.

Condition 2: Power shaft 10 may be rotating in a direction which results in the algebraic sum of the frequencies produced by the reference wheel and the exciter wheel frequency in the sensor coil being additive in which case the D.C. analog voltage applied to input 55 will be higher than that applied to input 56. The output at point 57 will be positive driving the meter in one direction from zero.

Condition 3: Power shaft 10 may be rotating in the opposite direction from that of Condition 2, which results in the algebraic sum of the frequencies produced by the reference wheel and the exciter wheel frequency being subtractive in which case the D.C. analog voltage applied to input 55 will be lower than that applied to input 56. The output at point 57 will be negative driving the meter in the other direction from zero.

It should be obvious to those skilled in the art that though no calibration adjustments are indicated that these are necessary and may be added to calibrate the meter reading in rpm, the direction of rotation being indicated by th direction of the needle swing from zero.

That which is claimed is:

1. A non-contacting sensing system for measuring the speed and direction of rotation of a driven shaft comprising a reference wheel mounted on the shaft, an exciter wheel adapted to be rotatably driven and mounted in the plane of said reference wheel, said wheels being spaced from each other to form an air gap between adjacent peripheral points, first sensing means disposed across said air gap for sensing relative motion between said wheels and developing a first signal related to the algebraic sum of the speed of the reference wheel and the exciter wheel, second sensing means disposed adjacent said exciter wheel for developing a second signal related to the speed of the exciter wheel and means for transforming said first and said second signals into a single output signal indicative of the speed and direction of rotation of the driven shaft.

2. A non-contacting sensing system as set forth in claim 1 further including a zero center indicating instrument connected to and adapted to be driven by said single output signal.

3. A non-contacting sensing system as set forth in claim 1 wherein said first sensing means and said second sensing means comprise magnetic pickup elements.

4. A non-contacting sensing system as set forth in claim 3, wherein said reference wheel and said exciter wheel are toothed, said first sensing means and said second sensing means having magnetic elements cooperatively disposed with the teeth of said wheels.

5. A non-contacting sensing system as set forth in claim 3, wherein each of said wheels are axially relieved and said first sensing means includes elements disposed on opposite sides of the air gap formed between adjacent peripheral points of the wheels and within the axial relieved portions of the wheels.

6. A non-contacting sensing system as set forth in claim 5, wherein said first sensing means is a magnetic element including a magnetic core comprising end portions and an intermediate magnet for establishing a quiescent flux across said air gap, opposite end portions being disposed on opposite sides of said air gap and within the axial relieved portions of the wheels.

7. A non-contacting sensing system as set forth in claim 1, wherein said exciter wheel and at least one of said sensing means is disposed entirely within a sealed housing.

8. A non-contacting sensing system as set forth in claim 1, wherein said exciter wheel and at least said second sensing means is disposed entirely within a sealed housing.

9. A non-contacting sensing system as set forth in claim 1, wherein said means for transforming said first and said second signal includes a first channel adapted to receive said first signal and transform said first signal into a D.C. voltage, a second channel adapted to receive said second signal and transform said second signal into a D.C. voltage and a D.C. comparator adapted to receive said D.C. voltages and provide a single D.C. output voltage proportional to the difference between the D.C. voltages.

10. A non-contacting sensing system as set forth in claim 1 further including a zero center indicating instrument connected to be driven by said single D.C. output voltage.

11. A non-contacting sensing system as set forth in claim 9 including a sealed dustproof housing for said exciter wheel and substantially the entire portion of the elements forming said first and said second sensing means.

12. A sensing system for measuring the speed and direction of rotation of a driven shaft comprising a reference wheel mounted on the shaft, a drive shaft, an exciter wheel mounted on the drive shaft and in the plane of the reference wheel, means for rotatably driving the drive shaft, said wheels being spaced such that their peripheries pass in close proximity to each other at one point, first pickup assembly means disposed about said one point and out of physical contact with said wheels for sensing the relative motion between said wheels and developing a signal relative to the algebraic sum of the speed of the wheels, a second non-contacting pickup assembly means disposed adjacent the periphery of the exciter wheel for developing a signal related to the speed of the exciter wheel and means for transforming said first and said second signals into a single output signal indicative of the speed and direction of rotation of the driven shaft.

13. A sensing system as set forth in claim 12, including a dustproof sealed housing enclosing all of the elements of the system except said drive shaft, said reference wheel and a portion of said first pickup assembly means.

14. A sensing system as set forth in claim 13, wherein said means for transforming said first and said second signal includes a first channel adapted to receive said first signal and transform said first signal into a D.C. voltage, a second channel adapted to receive said second signal and transform said second signal into a D.C. voltage and a D.C. comparator adapted to receive said D.C. voltages and provide a single D.C. output voltage proportional to the difference between the D.C. voltages.

15. A sensing system as set forth in claim 14 further including a zero center indicating instrument connected to be driven by said single D.C. output voltage.

16. A non-contacting sensing system as set forth in claim 1 further including means for continually driving said exciter wheel.

17. A non-contacting sensing system as set forth in claim 1 further including means for driving said exciter wheel at a constant speed.

* * * * *

UNITED STATES PATENT OFFICE
CERTIFICATE OF CORRECTION

Patent No. 3,787,769          Dated January 22, 1974

Inventor(s)     James R. Parkinson

It is certified that error appears in the above-identified patent and that said Letters Patent are hereby corrected as shown below:

In the heading, after item 22, insert

-- (Filed under Rule 47) --.

Signed and sealed this 15th day of October 1974.

(SEAL)
Attest:

McCOY M. GIBSON JR.                C. MARSHALL DANN
Attesting Officer                  Commissioner of Patents